Dec. 19, 1933.  A. M. MacDONALD  1,940,459
MEANS FOR MANUFACTURING SODA ASH
Filed Jan. 9, 1929  2 Sheets-Sheet 1
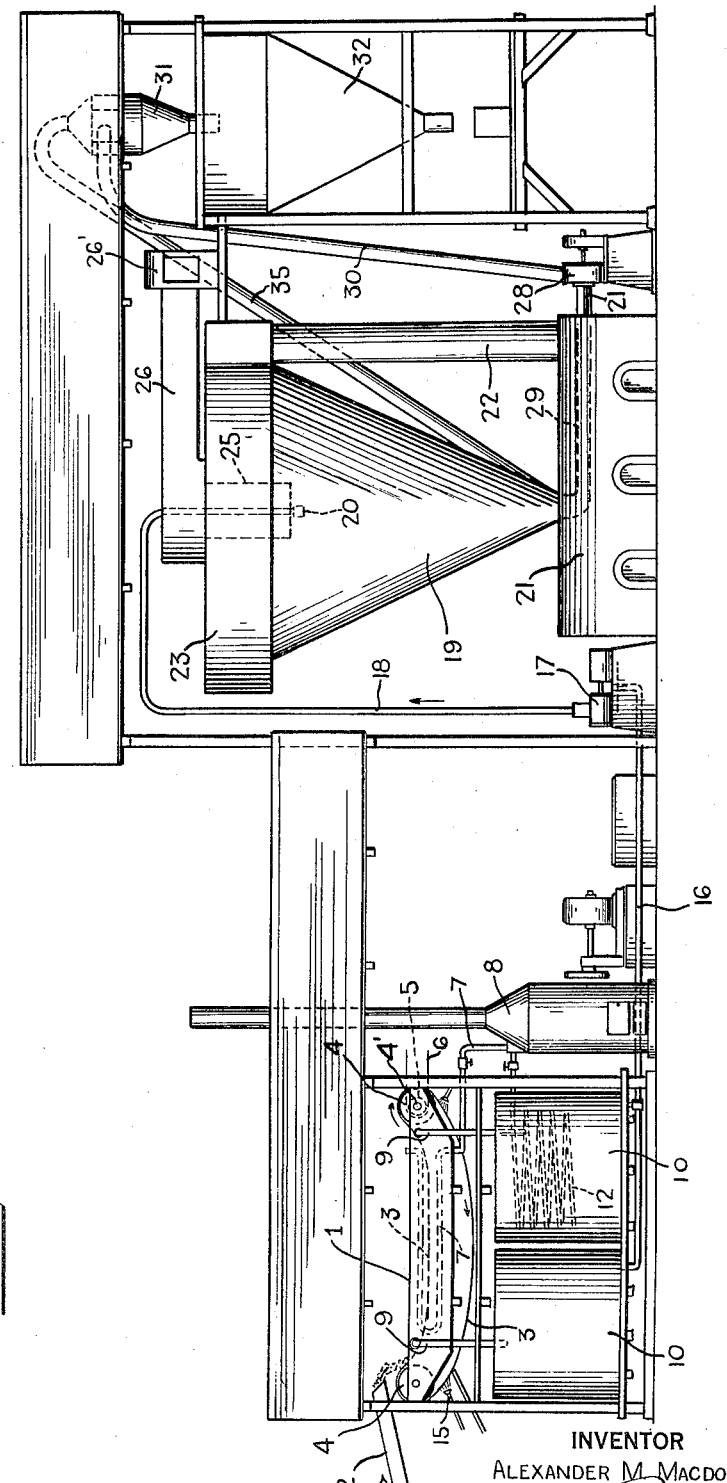
INVENTOR
ALEXANDER M. MACDONALD
BY
Cook & Robinson
ATTORNEY Dec. 19, 1933.  A. M. MacDONALD  1,940,459
MEANS FOR MANUFACTURING SODA ASH
Filed Jan. 9, 1929  2 Sheets-Sheet 2
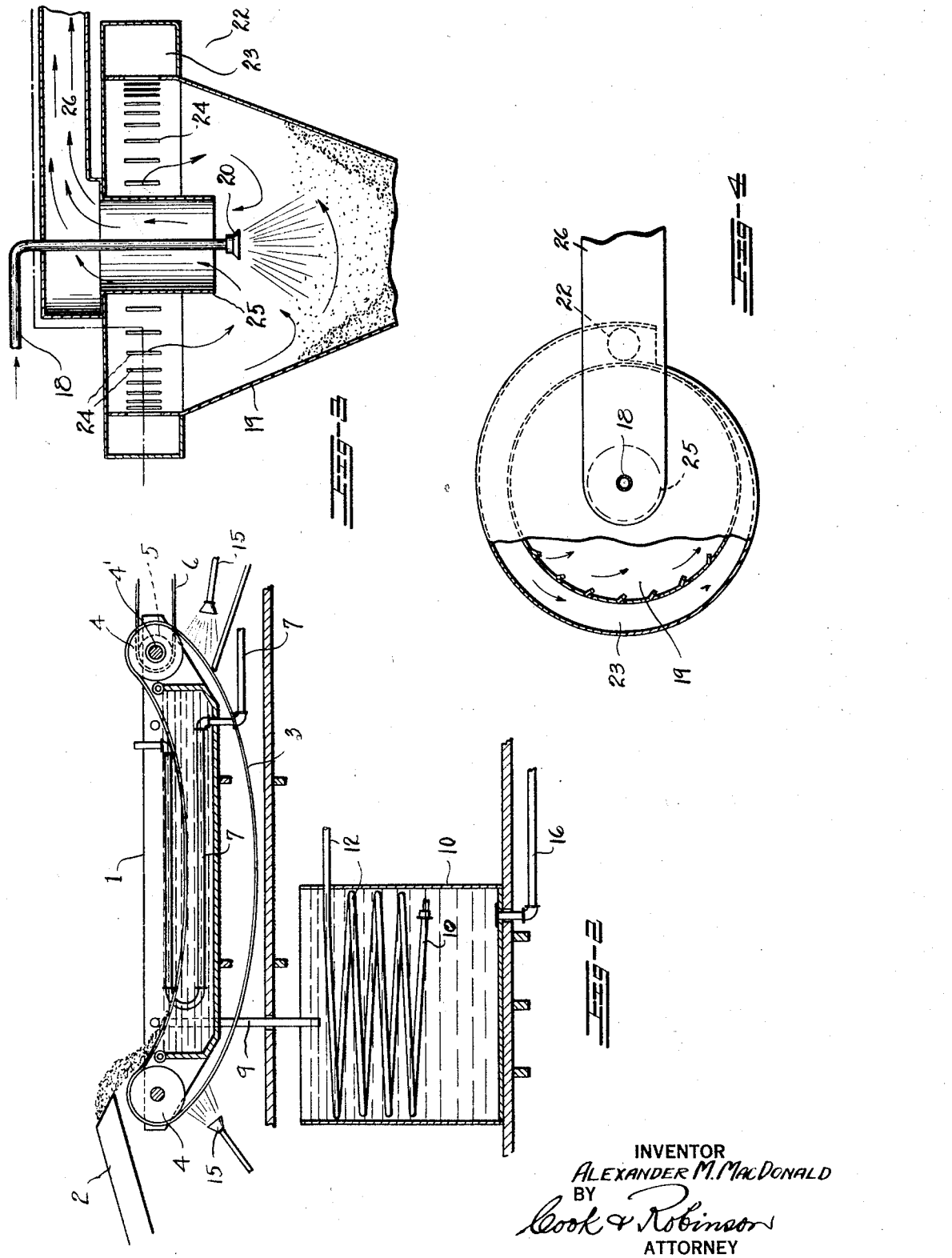
INVENTOR
ALEXANDER M. MacDONALD
BY
Cook & Robinson
ATTORNEY Patented Dec. 19, 1933

1,940,459

UNITED STATES PATENT OFFICE 1,940,459

MEANS FOR MANUFACTURING SODA ASH

Alexander M. MacDonald, Seattle, Wash.

Application January 9, 1929. Serial No. 331,176

1 Claim. (Cl. 23—267)

This invention relates to the manufacture of commercial anhydrous sodium carbonate or what is commonly known as soda ash. More particularly, it relates to a means for and method whereby clay, dirt or other impurities contained within the crystals of soda ash or sodium carbonate, as found in its natural state may be separated therefrom to render the product pure and commercially usable.

Explanatory to the present invention, it will be here stated that soda crystals or soda ash in its natural state is not commercially usable because of certain impurities contained therein. Such crystals contain a great amount of colloidal clay and other foreign matter which is very difficult to free and separate from the crystals to leave a commercially satisfactory product. Heretofore the process of purification has been carried on in many different ways and by various means and devices, and with varying degrees of success and as a general rule the processes used have proven unsatisfactory either because of the expense and time required or because of their ineffectiveness. Most processes heretofore used sought to effect separation of the impurities from the product by agitation of the dissolved crystals and by filtration, and it is principally in this respect that the present process differs from those heretofore used, as will presently be apparent.

In view of the above, it has been the principal object of this invention to provide a means for and process of purifying soda ash or sodium carbonate, that may be carried on at a relatively small expense, which is commercially economical, and satisfactory to an eminent degree in the results obtained.

More specifically, the present process contemplates, first, dissolving of the soda crystals as mined, in a basin above a slowly moving belt on which the impurities liberated from the crystals settle and are transferred from the solution; then, discharging the purified solution from an atomizing sprayer into a dehydrator where it is brought into contact with a whirling blast of heated air which absorbs and carries off the water but leaves the soda which falls in a powdery form within the dehydrator housing from which it is removed by air suction and ultimately delivered into a storage bin from which it may be discharged into sacks or containers for commercial distribution.

Other objects of the invention reside in the various details of construction of the means and devices used in carrying out the process and in the sequence of operations followed.

In accomplishing these and other objects of the invention, I have provided the improved details of construction, the preferred forms of which are illustrated in the accompanying drawings, wherein—

Figure 1 is an elevation showing a preferred arrangement of devices used in carrying out the present process.

Figure 2 is a sectional detail of the purifying basin into which the material is first delivered and dissolved, showing the conveyor belt on which the impurities liberated by dissolving settle and whereby they are removed from the basin.

Figure 3 is a sectional detail of the dehydrator, illustrating the disposition of the atomizer.

Figure 4 is a top view of the same; a part being in section for better illustration.

Referring more in detail to the drawings:

1 designates what may be termed the dissolving and purifying basin into which the soda crystals are delivered for purification. As here shown, the material is brought to the basin by means of a conveyor device of any suitable construction which I have designated at 2 and as this material is discharged from the conveyor it falls onto the top run of a flatly disposed, continuous belt 3 which operates about supporting wheels or rollers 4 mounted at opposite ends of the basin. As shown best in Figure 2, the basin is of an elongated character and the belt extends lengthwise thereof; the top run of the belt being suspended between the wheels 4 within the basin and the lower run passes below the basin. Any suitable means may be provided for driving or moving the belt to cause it to advance slowly through the basin from the end into which the material is delivered by the conveyor 2 toward the opposite end. I have shown the shaft 4' of one of the wheels 4 as being equipped with a belt wheel 5 over which a driving belt 6 operates; it being understood that the belt 6 may be driven by any suitable means, not herein illustrated.

At the start of an operation, the basin is filled up to a level above the top run of belt 3 with water which is heated to approximately 150° F. by any suitable means, such as by the use of steam pipes 7 contained therein and supplied by steam from a steam generating boiler 8. The soda crystals which are delivered into the heated water from the conveyor 2 are thereby dissolved. When the solution in the basin reaches a certain level, any additional amount will flow off through drainage pipes 9, leading from the basin, into storage tanks 10 disposed below the basin. These storage tanks are also heated so as to prevent cooling and crystallization of the solution and heating in this instance may also be carried on by use of steam pipes 12 also supplied by steam from the boiler 8 and preferably coiled within the tanks adjacent their side walls.

As the soda crystals are discharged into the basin at one end, they are readily dissolved in the hot solution, thereby freeing the impurities contained therein. These impurities ultimately settle onto the top run of belt 3 which moves slowly and gradually toward and finally from the opposite end of the basin, carrying with it the impurities which have settled thereon. At one or both ends of the basin, at the outside, are sprays 15 from which water may be discharged onto the belt to cleanse it before it again enters the basin; water under pressure being supplied by any suitable means.

The purified solution delivered from the basin 1 through pipes 9 into the storage tanks 10 is withdrawn from the latter through a pipe 16 and is delivered by the action of a high pressure pump 17 through a pipe 18 into the top central portion of a dehydrator 19 of downwardly tapered, conical form. At the discharge end of the pipe 18 is an atomizing spray head 20 whereby the solution is delivered radially thereof in a fog like mist. This spray is caught up by a whirling blast of hot air supplied by an air heating furnace 21 and delivered into the dehydrator through a vertical stack or pipe 22 into an air duct 23 that encircles the upper end of the dehydrator housing and from which slots, as at 24, open into the latter in a manner designed for producing a whirling blast of air within the dehydrator casing spirally and downwardly therein. This intaken blast of air results from the exhaustion of air from the top of the dehydrator housing through a pipe 25 which extends centrally into the dehydrator casing through the top wall and which connects at its upper end with a casing 26 leading to the housing 26' of a suction fan of any suitable character. The whirling blast of hot air drawn into the dehydrator naturally extracts all moisture from the atomized solution discharged from the atomizer 20 and the powdery residue, which is the purified soda ash, is carried centrifugally to the walls of the dehydrator where it settles and falls to the apex and is then drawn off by a suction fan 28 through a connecting pipe 29 and is delivered, by action of the fan, upwardly through a pipe 30 into a drum 31 from which it is discharged by gravity into a storage bin 32.

This bin 32 has a discharge spout 33 at its base from which the material may be delivered into containers for commercial distribution.

Exhaust from the top of drum 31, instead of being to atmosphere, discharges into a pipe 35 which leads back into the lower end of the dehydrator casing so as to save all that material which would otherwise be lost.

The foregoing is a description of a preferred and satisfactory arrangement of devices used in carrying out the process, but it is to be understood that various other arrangements could be devised for accomplishing the same results without departing from the spirit of the invention. For instance, by locating the basin 3 and tanks 10 above the dehydrator, the discharge of solution into the latter could be by gravity flow, thus eliminating the pump, however, this would in no way change the process. In view of this statement, it is not desired that those claims on the means for carrying out the process, be confined only to the arrangement and combination of devices herein illustrated.

Assuming the parts to be arranged as described, the process, briefly stated, is: First, delivering the soda crystals in their natural state into the basin 1 where they are dissolved in the heated solution and freed of their impurities; the latter settling on and being carried out on the belt 3 and the solution being delivered into the storage tanks 10. The solution is then withdrawn from the tanks 10 and discharged in an atomized condition into the dehydrator where the water is extracted by the hot air blast circulated through the dehydrator casing. The residue, after the removal of the water which is the purified soda ash settles and is withdrawn from the base of the dehydrator and is passed into a storage bin.

The above process and means whereby it is accomplished is simple in operation relatively inexpensive, commercially practical and produces a very superior product, and while described as being for the purification of soda ash it is just as well applicable for the purification of or treatment of various other substances, such as alum, salt, sodium sulphate, or salt cake from natural crystals, china clay, and all kinds of metallic solutions.

Having thus described my invention, what I claim as new therein and desire to secure by Letters-Patent, is:

In an apparatus of the character described, a solution containing basin, rollers at opposite ends of the basin, a continuous belt operating about said rollers with its upper run suspended within the basin and its lower run below the basin, means for slowly advancing the belt, means for delivering material into the basin to be dissolved in the solution to precipitate impurities therein onto said belt, and means for removing the said impurities from the belt after they have been carried thereon from the basin.

ALEXANDER M. MacDONALD.